(12) United States Patent
Maehara et al.

(10) Patent No.: US 7,992,474 B2
(45) Date of Patent: Aug. 9, 2011

(54) COVER STRUCTURE AND MACHINE TOOL WITH THE COVER STRUCTURE

(75) Inventors: Tomonori Maehara, Tokorozawa (JP); Umeo Tsuyusaki, Sayama (JP)

(73) Assignee: Citizen Holdings Co., Ltd., Tokyo (JP)

( * ) Notice: Subject to any disclaimer, the term of this patent is extended or adjusted under 35 U.S.C. 154(b) by 743 days.

(21) Appl. No.: 12/092,244

(22) PCT Filed: Oct. 31, 2006

(86) PCT No.: PCT/JP2006/322211
§ 371 (c)(1),
(2), (4) Date: Apr. 30, 2008

(87) PCT Pub. No.: WO2007/052813
PCT Pub. Date: May 10, 2007

(65) Prior Publication Data
US 2009/0260492 A1    Oct. 22, 2009

(30) Foreign Application Priority Data
Nov. 2, 2005 (JP) .................................. 2005-319521

(51) Int. Cl.
B23B 7/00 (2006.01)
B23B 25/00 (2006.01)

(52) U.S. Cl. ................................ 82/124; 82/152; 82/125

(58) Field of Classification Search .................. 82/152, 82/127, 124, 125, 126; 483/3, 14; 29/33 E, 29/57; 74/608; 451/451
See application file for complete search history.

(56) References Cited

U.S. PATENT DOCUMENTS
5,439,431 A    8/1995    Hessbrüggen et al.

FOREIGN PATENT DOCUMENTS
| JP | 59-171048 | 11/1984 |
| JP | 62-1808 | 1/1987 |
| JP | 9-314403 | 12/1997 |
| JP | 10-43904 | 2/1998 |
| JP | 2001-179572 | 7/2001 |

Primary Examiner — Will Fridie, Jr.
(74) Attorney, Agent, or Firm — Finnegan, Henderson, Farabow, Garrett & Dunner, L.L.P.

(57) ABSTRACT

A separator chute is placed at a standby position while a part is machined, and when the processing of the part is completed, the separator chute is swung and moved to a reception position to receive the part separated from a spindle. An opening portion of a cover structure, formed near a pivot shaft of the separator chute, is formed in the size through which the machined part can be discharged. The opening portion is closed by the separator chute when the chute is in the standby position and opened when the chute is in the reception position.

10 Claims, 3 Drawing Sheets

COVER STRUCTURE AND MACHINE TOOL WITH THE COVER STRUCTURE

BACKGROUND ART

1. Technical Field

The present invention relates to a cover structure of a machine tool for preventing cutting chips or cutting oil from scattering during machining of the machine tool, and specifically, to a cover structure of an automatic lathe for machining a rod-shaped workpiece. The invention also relates to a machine tool having such a cover structure.

2. Description of the Related Art

Generally, in an automatic lathe for sequentially producing a plurality of parts by machining an elongated material or a rod-shaped workpiece, or a shorter rod-shaped workpiece automatically supplied to the lathe, as shown in Japanese Unexamined Patent Publication No. 2001-310201, a movable separator chute for receiving a machined part and a box for containing the part moved on the separator chute, are provided. Accordingly, in a conventional automatic lathe for machining a rod-shaped workpiece, a cover for preventing cutting chips or cutting oil from scattering during machining normally covers not only a spindle and an adjacent area thereof, but also the entire automatic lathe for safety and structural reasons.

In an automatic lathe having a constitution as shown in Japanese Unexamined Patent Publication No. 2001-310201, a machined part separated from a spindle is contained in a box via a separator chute. Alternatively, in another known automatic lathe, a machined part separated from a spindle is positioned or dropped on a belt conveyor arranged within the lathe (or within the cover structure) instead of the box, and then the machined part is ejected from an outlet formed on a suitable place of the conveyor.

In the above automatic lathe, when either the box or the belt conveyor is used, the machined part cannot be immediately observed or checked. Further, it is difficult to separate the cutting oil or cutting tool from the machined part. In other words, in the case that machined parts are accumulated in the box, a door or the like arranged in the cover cannot be opened or closed during machining for safety reasons. Even if the box containing the machined part can be opened or closed, it may be troublesome to check the machined parts since cutting chips or cutting oil may scatter during machining. Therefore, in order to check a machined part, it is necessary to take out and check the part when the machining is complete or when the machining is purposely interrupted. Thus, it is difficult to check the part in an early stage of machining, resulting in a loss of efficiency if errors or problems occur during machining.

Also, if a belt conveyor is used, the machined part can be sequentially conveyed and ejected by the conveyor. Therefore, the machined part can be checked before a series of machining is complete, unlike the case of parts box. However, the belt conveyor is often intermittently operated in order to prevent the machined parts from becoming damaged by contacting each other, and further, the belt conveyor is arranged within the cover structure of the machine tool. Therefore, it takes considerable time to eject the machined part outside the machine tool by means of the belt conveyor via a separator chute, which means that an error or trouble in machining cannot be immediately found.

SUMMARY OF THE INVENTION

It is an object of the present invention to provide a cover structure capable of allowing a machined part to be rapidly checked while safety is maintained, even when the cover structure is configured to cover an entire machined tool for sequentially machining a plurality of parts. Another object of the invention is to provide a machine tool having the cover structure.

In order to achieve the above object, the present invention provides a cover structure for covering a spindle and a tool holder of a machine tool, the machine tool having a pedestal on which the spindle and the tool holder are arranged such that the spindle and the tool holder may be moved relative to each other, the machine tool being configured to sequentially machine a plurality of parts each having a designed shape, by applying a tool, rotatably held by the tool holder or fixed to the tool holder in a predetermined direction, to a workpiece held by the spindle, wherein the cover structure comprises: a recessed portion formed in a part of the cover structure or near the boundary between the pedestal and the cover structure; an opening portion communicated with the recessed portion, for ejecting a machined part having a designed shape and separated from the spindle outside of the cover structure; and a closing means for the opening portion, configured to open the opening portion when the part is ejected and to close the opening portion, except when the part is ejected.

The closing means may be a separator chute arranged near the opening portion and configured to receive a machined part separated from the spindle, the separator chute being positioned at a standby position, during the time each part is machined, where the separator chute is away from the spindle and closes the opening portion, and being positioned at a reception position, when machining of each part is complete and the part is about to be separated from the spindle, where the separator chute is close to the spindle so as to receive the part and opens the opening portion.

The separator chute may have a gutter shape and be configured to move between the standby position and the reception position by rotating about a pivot axis arranged near the opening portion.

Concretely, the closing means may be a shutter configured to close the opening portion during the time each part is machined and to open the opening portion when machining of each part is complete.

The cover structure may further have a separator chute arranged near the opening portion and configured to receive a machined part separated from the spindle. In this case, the separator chute is configured to be positioned at a standby position, during the time each part is machined, where the separator chute is away from the spindle and closes the opening portion, and to be positioned at a reception position, when machining of each part is complete and the part is about to be separated from the spindle, where the separator chute is close to the spindle so as to receive the part and opens the opening portion. The shutter is also configured to close the opening portion when the separator chute is positioned at the standby position and to open the opening portion when the separator chute is positioned at the reception position.

Further, the separator chute may include a first member having a gutter shape and a second member telescopically containing the first member, the second member being configured to contain the first member and be positioned outside of the cover structure in relation to the opening portion when the separator chute is positioned at the standby position, and the first and second member being configured such that the second member is moved inside of the opening portion and the first member is moved relative to the second member toward the machined part to be received when the separator chute is positioned at the reception position.

The present invention also provides a machine tool including the above cover structure.

The machine tool may further include a receiving box positioned within the recessed portion of the cover structure, for receiving the part ejected from the opening portion of the cover structure.

A channel, extending parallel to the axial direction of the spindle, may be positioned in the recessed portion of the cover structure, and the machine tool may further include a conveying device positioned in the channel in the recessed portion, for conveying the part ejected from the opening.

BRIEF DESCRIPTION OF THE DRAWINGS

The above and other objects, features, and advantages of the present invention will become more apparent from the description of the preferred embodiments as set forth below with reference to the accompanying drawings, wherein.

DETAILED DESCRIPTION

The present invention will be described in detail below with reference to the drawings.

Figure 1:
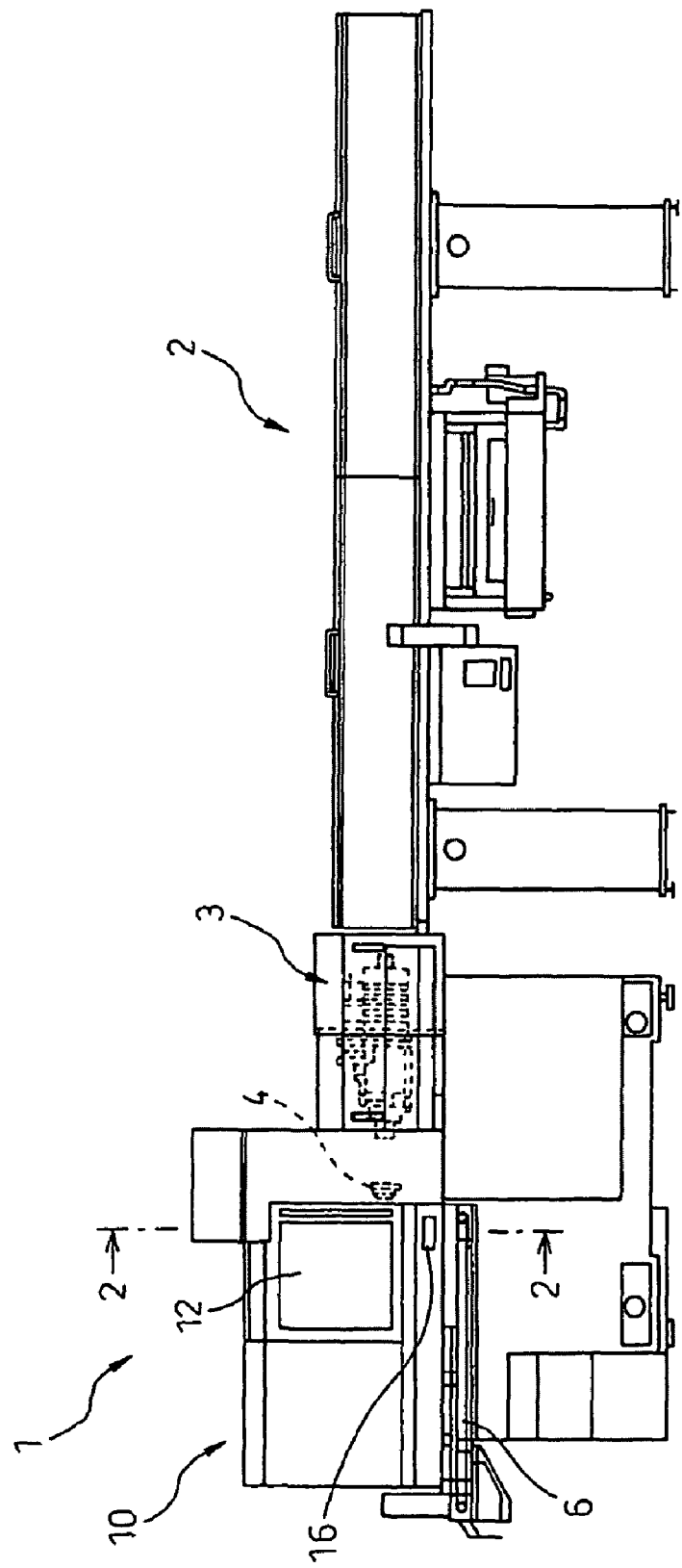
FIG. 1 is a side view of a bar feeder and an automatic lathe having a cover structure according to the present invention.

FIG. 1 is a side view showing an automatic lathe 1 having a cover structure 10 according to the present invention and a feeding device or a bar feeder 2 for feeding a bar-shaped material to be machined (not shown) to the automatic lathe 1. The cover structure 10 is configured to entirely cover an upper side of the lathe 1. The upper side of the lathe 1 includes a pedestal on which a spindle 3 and a tool holder (not shown) are arranged and an area near the spindle (or a machining area). The cover structure prevents cutting chips and/or cutting oil from scattering during machining and inhibits an operator from accessing the inside of the automatic lathe (i.e., the machining area). The cover structure 10 as a whole may be made from a steel plate or iron plate, and may have a window 12 for allowing the operator to observe the machining state from the outside of the cover. The window 12 may be made from a transparent material such as acrylic.

Figure 2:
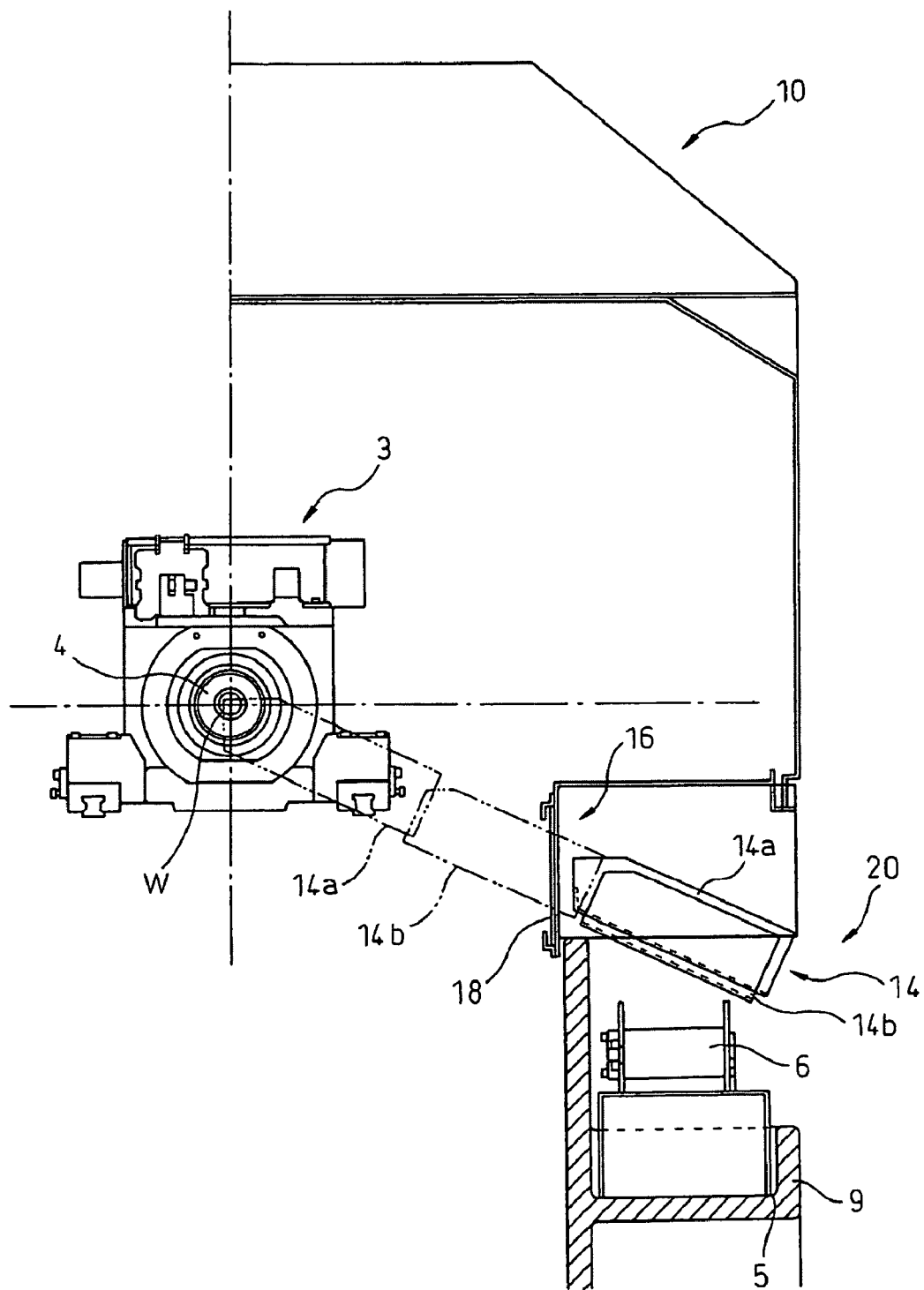
FIG. 2 is a cross sectional view along 2-2 line of FIG. 1.

FIG. 2 is a cross sectional view of the cover structure along 2-2 line of FIG. 1. The cover structure 10 has a separator chute 14, an opening portion 16 having the size capable of allowing the separator chute 14 and a machined part from the rod-shaped material to pass through the opening portion, and a closing means or a shutter 18 for closing the opening portion 16. As shown, the cover structure 10 and a pedestal 9 cooperatively form a recessed portion 20 near a boundary between the cover structure 10 and the pedestal 9. The opening portion 16 is arranged so as to communicate with the recessed portion 20. The recessed portion 20 may be formed a part of the cover structure other than the boundary between the cover structure 10 and the pedestal 9.

The separator chute 14 includes first and second members 14a and 14b each having a gutter shape and telescopically engaging each other, whereby the entire separator chute 14 may be expanded and contracted. While a part is machined, as shown by a solid line in FIG. 2, the first member 14a is contained within the second member 14b and the separator chute 14 is positioned outside of the shutter 18 during which the shutter 18 is closed during this period. The opening portion 16 is preferably positioned near a guide bush 4 of the spindle 3 (i.e., the position where the part is machined), as shown in FIG. 1.

When a part W, obtained by machining a rod shaped material, is separated from the spindle 3, the shutter 18 is opened and the separator chute 14 approaches the spindle and is positioned at a position where the separator chute 14 may receive the machined part W. In detail, the second member 14b containing the first member 14a is moved to a position indicated by a two-dot chain line through the opening portion 16 by means of a slide mechanism or the like (not shown). Further, the first member 14a is moved toward the center of the spindle 3 (in other words, the separator chute 14 is extended) until the front end of the first member 14a is positioned below the part W, as indicated by a two-dot chain line. The opening or closing motion of the shutter 18 may be automatically performed corresponding to the timing of machining of the part.

When the separator chute 14 is positioned as indicated by the two-dot chain line of FIG. 2, the machined part W is separated from the spindle (or dropped) and received by the first member 14a. Since the first and second members 14a and 14b are inclined as illustrated, the part W is rollingly or slidably moved on the chute 14 and ejected outside from the opening portion 16. The ejected part is conveyed by a belt conveyor 6 arranged in a channel 5 formed on the pedestal 9. The channel 5 is positioned within the recessed portion 20 and outside of the opening portion 16. The channel 5 extends parallel to the axial direction of the spindle 3 such that the belt conveyor 6 does not project outside of the cover structure. Then, the first and second members 14a and 14b are returned to the position as indicated by the solid line of FIG. 2, until the machining of a next part begins. After that, the shutter 18 is closed and the machining of the next part begins.

In the prior art, since a box or a belt conveyor for receiving a machined part is positioned within a cover structure, the machined part cannot be observed until a series of machining (or the machining of the rod-shaped material) is completed or a certain period of time has elapsed. On the other hand, in the embodiment of the invention, the belt conveyor 6 is positioned at a position where the conveyor can always be accessible from the outside. Therefore, the state of each part can be easily checked even during machining of the rod-shaped material. In addition, by positioning the belt conveyor 6 in the recessed portion 20, the advantage of the invention may be obtained without substantially changing the whole occupied area of the cover structure.

In the above embodiment, the separator chute 14 having the gutter shape is used for moving the machined part to the opening portion 16. However, instead of the separator chute, a manipulator or the like, capable of holding and transferring the machined part to the opening portion, may be used.

Figure 3:
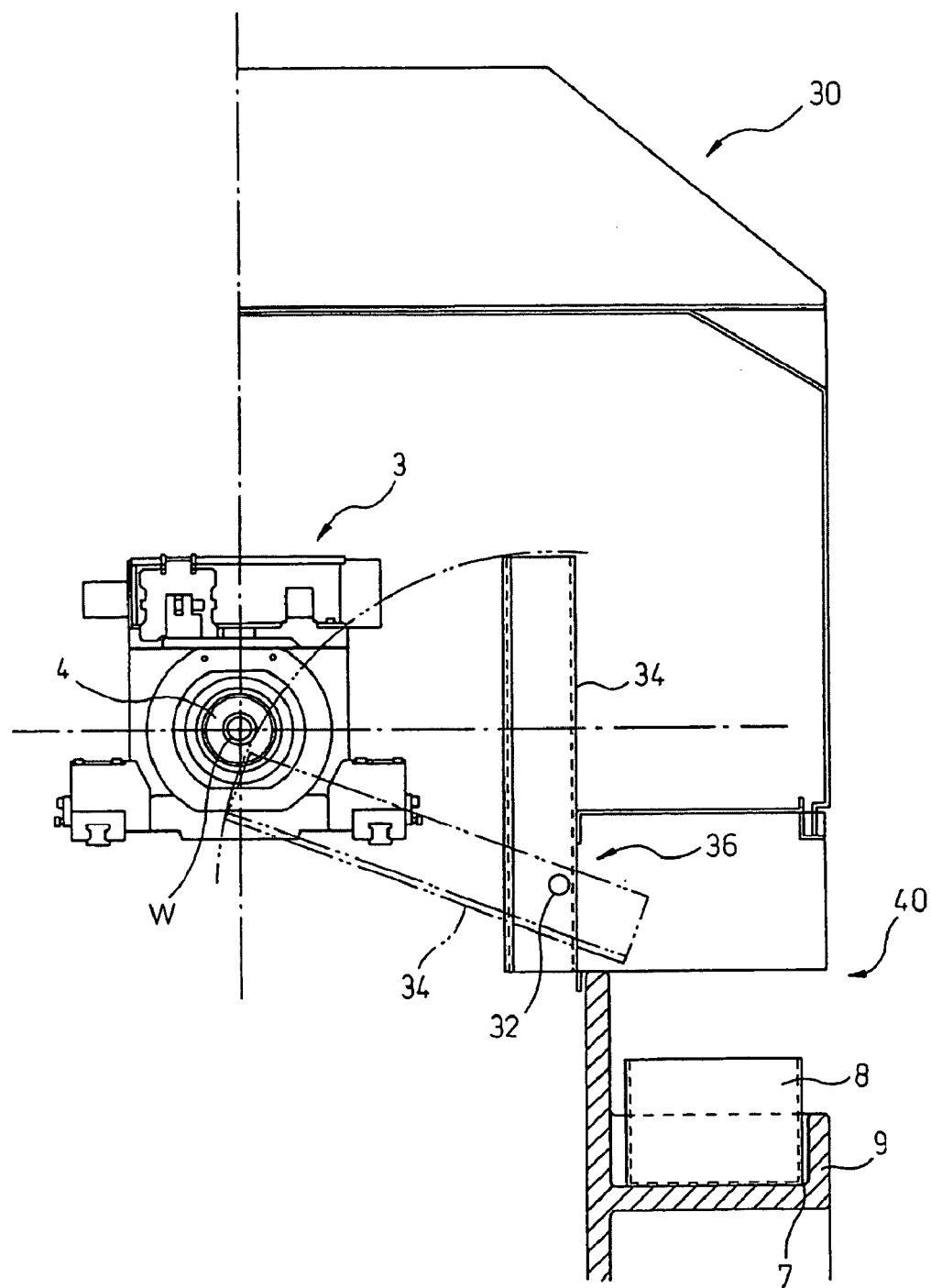
FIG. 3 is a view, similar to FIG. 2, showing another preferable embodiment of the cover structure.

FIG. 3 is a cross sectional view, viewed from the same direction as FIG. 2, of a cover structure 30 according to a second embodiment of the invention. The cover structure 30 of the second embodiment is different from the cover structure 10 of the first embodiment in that a separator chute may also have the function of opening and closing the opening portion.

As shown in FIG. 3, the cover structure 30 has a gutter-shaped separator chute 34 configured to be rotated about a pivot axis 32. The separator chute 34 is positioned at a standby position indicated by a solid line during a part is machined and, after machining of the part is complete, then rotated to a reception position indicated by a two-dot chain line in order to receive the machined part separated from the spindle 3. The cover structure 30 has an opening portion 36 near a pivot axis 32 of the separator chute 34. Similar to the first embodiment, the cover structure 30 and the pedestal 9 cooperatively form a recessed portion 40 near a boundary between the cover structure 30 and the pedestal 9. The opening portion 36 is arranged so as to communicate with the recessed portion 40. The recessed portion 40 may be formed a part of the cover structure other than the boundary between the cover structure 30 and the pedestal 9.

The opening 36 having the size through which the machined part may be ejected. Further, the opening 36 is closed by the separator chute 34 when the separator chute is positioned at the standby position and is opened when the separator chute is positioned at the reception position. The shutter 18 of the cover structure 10 of the first embodiment is not necessary for the cover structure 30 of the second embodiment, whereby the constitution of the cover structure 30 may be more simply constructed.

When the separator chute 34 is rotatably moved to the reception position as indicated by a two-dot chain line of FIG. 3, the machined part W is separated (or dropped) from the spindle and received by the chute 34 at the front end thereof. Since the chute 34 is inclined as illustrated, the part W is rollingly or slidably moved on the chute 34 and ejected outside from the opening portion 36. The ejected part is received by a receiving box 8 arranged in a pocket 7. The pocket 7 is formed within the recessed portion 40 and outside and below the opening portion 36. Then, the chute 34 is rotatably returned to the standby position until the machining of a next part begins. After that, the opening 36 is closed and the machining of the next part begins. In this way, the machined part may be immediately received by the outside box 8, which allows the operator to quickly and easily check the state of the machined part and/or trouble. In this case, by also positioning the receiving box 8 in the recessed portion 40, the entire occupied area of the cover structure 30 is not substantially changed compared to that of the prior art.

In addition, in FIG. 3, the part ejected from separator chute 34 is received by the receiving box 8. However, the receiving box 8 may be replaced with the belt conveyor 6 as shown in FIG. 1 or a not shown linearly movable structure (for example, a loading platform for a machined part capable of linearly moving by means of an air cylinder).

According to the present invention, in an automatic lathe, for example, for sequentially producing a plurality of parts by machining a rod-shaped workpiece, or shorter rod-shaped workpieces automatically supplied to the lathe, a machined part may be immediately ejected outside while maintaining safety. Therefore, an operator can easily check a machined part at the beginning of machining and can immediately notice an error or trouble in machining, whereby a loss in production efficiency during machining may be minimized by an appropriate action of the operator.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A cover structure for covering a spindle and a tool holder of a machine tool, the machine tool having a pedestal on which the spindle and the tool holder are arranged such that the spindle and the tool holder may be moved relative to each other, the machine tool being configured to sequentially machine a plurality of parts each having a designed shape, by applying a tool, rotatably held by the tool holder or fixed to the tool holder in a predetermined direction, to a workpiece held by the spindle, wherein the cover structure comprises:
   a recessed portion formed in a part of the cover structure or near the boundary between the pedestal and the cover structure;
   an opening portion communicated with the recessed portion, for ejecting a machined part having a designed shape and separated from the spindle outside of the cover structure; and
   a channel positioned in the recessed portion of the cover structure and extending parallel to the axial direction of the spindle.

2. The cover structure as set forth in claim 1, further comprising a closing means for the opening portion, configured to open the opening portion when the part is ejected and to close the opening portion, except when the part is ejected, and wherein the closing means is a separator chute arranged near the opening portion and configured to receive a machined part separated from the spindle, the separator chute being positioned at a standby position, during the time each part is machined, where the separator chute is away from the spindle and closes the opening portion, and being positioned at a reception position, when machining of each part is complete and the part is about to be separated from the spindle, where the separator chute is close to the spindle so as to receive the part and opens the opening portion.

3. The cover structure as set forth in claim 2, wherein the separator chute has a gutter shape and is configured to move between the standby position and the reception position by rotating about a pivot axis arranged near the opening portion.

4. The cover structure as set forth in claim 1, further comprising a closing means for the opening portion, configured to open the opening portion when the part is ejected and to close the opening portion, except when the part is ejected, and wherein the closing means is a shutter configured to close the opening portion during the time each part is machined and to open the opening portion when machining of each part is complete.

5. The cover structure as set forth in claim 4, further comprising a separator chute arranged near the opening portion and configured to receive a machined part separated from the spindle, wherein the separator chute is configured to be positioned at a standby position, during the time each part is machined, where the separator chute is away from the spindle and closes the opening portion, and to be positioned at a reception position, when machining of each part is complete and the part is about to be separated from the spindle, where the separator chute is close to the spindle so as to receive the part and opens the opening portion, and wherein the shutter is configured to close the opening portion when the separator chute is positioned at the standby position and to open the opening portion when the separator chute is positioned at the reception position.

6. The cover structure as set forth in claim 5, wherein the separator chute includes a first member having a gutter shape and a second member telescopically containing the first member, the second member being configured to contain the first member and be positioned outside of the cover structure in relation to the opening portion when the separator chute is positioned at the standby position, and the first and second member being configured such that the second member is moved inside of the opening portion and the first member is moved relative to the second member toward the machined part to be received when the separator chute is positioned at the reception position.

7. A machine tool comprising the cover structure as set forth in claim 1.

8. The machine tool as set forth in claim 7, further comprising a receiving box positioned within the recessed portion of the cover structure, for receiving the part ejected from the opening portion of the cover structure.

9. The machine tool as set forth in claim 7, further comprising a conveying device positioned in the channel in the recessed portion, for conveying the part ejected from the opening.

10. The machine tool as set forth in claim 9, wherein the conveying device is a belt conveyor which is always accessible from the outside.

* * * * *